United States Patent
Bivans et al.

(10) Patent No.: US 10,025,306 B2
(45) Date of Patent: Jul. 17, 2018

(54) SYSTEM AND METHOD FOR REMOTE CONTROL OF UNMANNED VEHICLES

(71) Applicants: Nathan Bivans, Cinnaminson, NJ (US); David Luksenberg, Penn Valley, PA (US)

(72) Inventors: Nathan Bivans, Cinnaminson, NJ (US); David Luksenberg, Penn Valley, PA (US)

( * ) Notice: Subject to any disclaimer, the term of this patent is extended or adjusted under 35 U.S.C. 154(b) by 122 days.

(21) Appl. No.: 15/295,635

(22) Filed: Oct. 17, 2016

(65) Prior Publication Data

US 2017/0192427 A1 Jul. 6, 2017

Related U.S. Application Data

(63) Continuation-in-part of application No. 14/846,866, filed on Sep. 7, 2015, now Pat. No. 9,720,419, which
(Continued)

(51) Int. Cl.
*G05D 1/00* (2006.01)
*E02F 9/24* (2006.01)
(Continued)

(52) U.S. Cl.
CPC .......... *G05D 1/0077* (2013.01); *B25J 13/006* (2013.01); *B25J 13/06* (2013.01);
(Continued)

(58) Field of Classification Search
CPC ......... G05D 1/0077; G05D 2201/0202; G05D 1/0011; G05D 1/0022; G05D 1/0038; H04M 1/7253; H04L 12/5692; H04L 69/24; H04L 67/34; H04W 92/02; H04W 8/183; H04W 4/023; H04W 4/80; H04W 4/50; G06F 15/16; H04B 7/005; B25J 13/006;
(Continued)

(56) References Cited

U.S. PATENT DOCUMENTS 6,109,568 A * 8/2000 Gilbert .................. B61L 23/005
104/88.03
8,977,414 B2 * 3/2015 Yamada .................. B60L 15/40
701/20
(Continued)

*Primary Examiner* — Behrang Badii
(74) *Attorney, Agent, or Firm* — Michael Tieff

(57) ABSTRACT

A first device is provided. The first device includes a first processing unit, wherein the first processing unit is adapted to determine a first status of a first connection between the first processing unit of the first device and a corresponding first processing unit of a second device; and a second processing unit, wherein the second processing unit is adapted to determine a second status of a second connection between the second processing unit of the first device and a corresponding second processing unit of the second device. The first processing unit is further adapted to: receive the second status of the second connection from the second processing unit of the first device over a path between the first processing unit of the first device and the second processing unit of the first device; and determine one or more actions to take with respect to a machine associated with the first device based on one or both of the first status and the second status.

19 Claims, 12 Drawing Sheets

OIP 100

Related U.S. Application Data is a continuation of application No. 14/044,136, filed on Oct. 2, 2013, now Pat. No. 9,156,476.

(60) Provisional application No. 61/709,091, filed on Oct. 2, 2012.

(51) Int. Cl.

| | |
|---|---|
| *E02F 9/20* | (2006.01) |
| *B25J 13/00* | (2006.01) |
| *B25J 13/06* | (2006.01) |
| *B25J 19/06* | (2006.01) |
| *F41H 11/16* | (2011.01) |
| *G05B 19/048* | (2006.01) |
| *E02F 3/76* | (2006.01) |
| *H04W 76/15* | (2018.01) |
| *G06F 15/16* | (2006.01) |
| *H04M 1/725* | (2006.01) |
| *H04W 8/18* | (2009.01) |
| *H04B 7/005* | (2006.01) |
| *B60L 11/18* | (2006.01) |
| *B60L 15/40* | (2006.01) |
| *B61L 3/00* | (2006.01) |
| *B61L 23/00* | (2006.01) |
| *B61L 23/34* | (2006.01) |
| *H02P 6/00* | (2016.01) |

(52) U.S. Cl.
CPC .............. *B25J 19/06* (2013.01); *E02F 9/205* (2013.01); *E02F 9/24* (2013.01); *F41H 11/16* (2013.01); *G05B 19/048* (2013.01); *G05D 1/0011* (2013.01); *G05D 1/0022* (2013.01); *G05D 1/0038* (2013.01); *B60L 11/1803* (2013.01); *B60L 15/40* (2013.01); *B61L 3/00* (2013.01); *B61L 23/005* (2013.01); *B61L 23/34* (2013.01); *E02F 3/7609* (2013.01); *G05B 2219/23471* (2013.01); *G05D 2201/0202* (2013.01); *G06F 15/16* (2013.01); *H02P 6/00* (2013.01); *H04B 7/005* (2013.01); *H04M 1/7253* (2013.01); *H04W 8/183* (2013.01); *H04W 76/15* (2018.02); *Y10S 901/01* (2013.01)

(58) Field of Classification Search
CPC .. B25J 13/06; B25J 19/06; E02F 9/205; E02F 9/24; E02F 3/7609; F41H 11/16; B60L 11/1803; B60L 15/40; B61L 3/00; B61L 23/005; B61L 23/34; G05B 19/048; G05B 2219/23471; H02P 6/00; Y10S 901/01

See application file for complete search history.

(56) References Cited

U.S. PATENT DOCUMENTS

| | | | |
|---|---|---|---|
| 2010/0077031 A1* | 3/2010 | Yoneda | H04M 1/7253 709/204 |
| 2014/0055077 A1* | 2/2014 | Barrass | B60L 11/1803 318/700 |
| 2014/0214248 A1* | 7/2014 | Yamada | B60L 15/40 701/20 |

* cited by examiner

800

SYSTEM AND METHOD FOR REMOTE CONTROL OF UNMANNED VEHICLES

CROSS-REFERENCE TO RELATED APPLICATIONS

This application is a continuation-in part of U.S. patent application Ser. No. 14/846,866. This application claims priority to U.S. Provisional Patent Application No. 61/709,091, U.S. patent application Ser. No. 14/044,136, and U.S. patent application Ser. No. 14/846,866. The contents of all three applications are hereby incorporated by reference in their entirety.

BACKGROUND

The use of autonomous or unmanned vehicles is growing. Unmanned vehicles may be suitable for a variety of industries including construction, manufacturing, and military. While there are many advantages associated with the use of autonomous vehicles, there are also several issues.

On such issue is safety. For example, how do we ensure that unmanned vehicles can be stopped should they become unresponsive due to a software malfunction, or when a remote operator becomes incapacitated or otherwise loses control of the vehicle? Another issue is interoperability. Currently there exist many proprietary systems for unmanned vehicles, making it difficult to design systems or applications that will work across a variety of vehicle systems and types.

SUMMARY

A first device is provided. The first device includes a first processing unit, wherein the first processing unit is adapted to determine a first status of a first connection between the first processing unit of the first device and a corresponding first processing unit of a second device; and a second processing unit, wherein the second processing unit is adapted to determine a second status of a second connection between the second processing unit of the first device and a corresponding second processing unit of the second device. The first processing unit is further adapted to: receive the second status of the second connection from the second processing unit of the first device over a path between the first processing unit of the first device and the second processing unit of the first device; and determine one or more actions to take with respect to a machine associated with the first device based on one or both of the first status and the second status.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
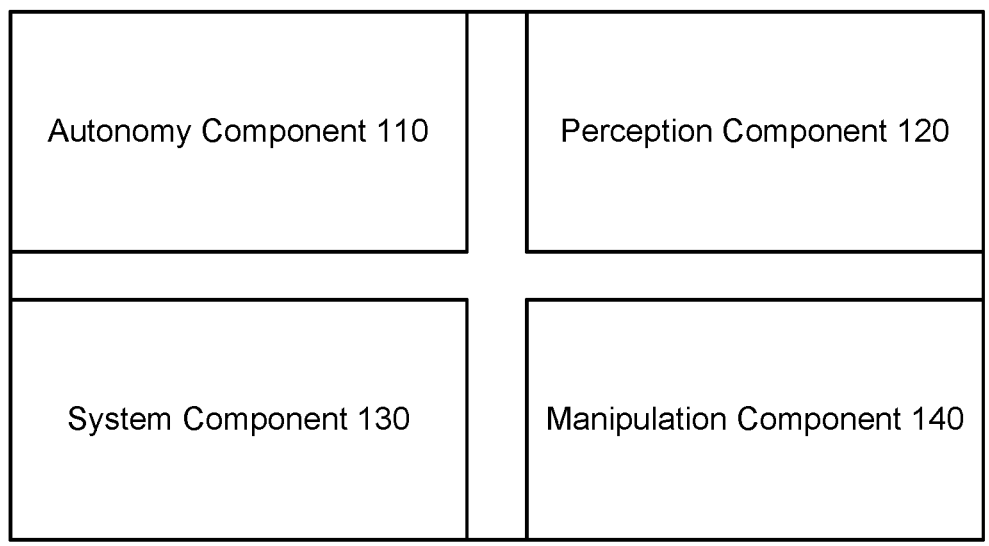
FIG. 1 is a high level illustration of the OIP.

FIG. 1 is a high level illustration of the Open Integration Platform (OIP) 100. The OIP 100 is a control system for machinery (such as manned and unmanned vehicles, robots, factory or manufacturing equipment, etc. The OIP 100 may translates user commands into manipulations or movements of the machinery and may provide for failsafe integration of third-party software, sensors, and actuation peripherals through an application programming interface (API). The OIP 100 may be configured to communicate with many robotic systems and vehicle command protocols and is portable across platforms in alternate operational scenarios.

The OIP 100 may be designed to allow for easy integration with respect to one or more components through the API. Examples of such components are illustrated in FIG. 1, and include autonomy software component 110, perception component 120, unmanned system component 130, and manipulation components 140. Other components may be supported.

As will be described further below, the OIP 100 may further include one or more built-in or base features. One example of such a feature is the ability to interface and control a variety of types of machinery such as vehicles. The OIP 100 may support a variety of mechanical control interfaces including Drive-by-wire, for example. Other control interfaces may be supported. The control commands and protocols used for a variety of machine and vehicle types may be abstracted by the API into a single control library of functions, allowing users and programmers to create a single custom software component that may be used to control a variety of machine and vehicle types using the API. The OIP 100 may similarly provide a single library of functions that may be used to control and interact with a variety of sensors and peripheral devices.

Another example of an integrated feature is safety features. The safety features may be integrated into the OIP and kept separate from the other components of the OIP such that one or more of the autonomy software components 110, system components 130, perception components 120, and manipulation components 140 can be changed by users without compromising the safety of the system as a whole. Further, such built in safety features allow users to create their own components for the OIP 100 using the API without having to consider how to implement safety features, or worrying about interfering with existing safety features.

Any unmanned or manned system developed using the OIP 100 as the integration hub may achieve the following advantages when compared with existing systems:

Flexibility: The flexible API provided by the OIP 100 allows for a wide variety of components to be easily added or removed from any unmanned system that uses the OIP 100. For example, users may add or remove components from the unmanned system as threats, mission needs, technologies, or budgets change. The open system of the OIP 100 ensures that the user can use a range of sensors and/or software components from a wide range of providers in their unmanned system, not just those provided by the original manufacturer of the unmanned system.

Safety: By separating the safety features from the computation engine, any unmanned system built using the OIP 100 is assured a high level of safety. Furthermore, an open system built on OIP 100 may allow the components to be changed or modified without affecting the safety features of the system.

Speed: Any unmanned vehicle built using the OIP 100 includes locked down protocols for low-level critical commands and safety supervision. Because these crucial elements of the system remain unchanged, all other elements of the system can be changed much faster than if the core elements had to be redesigned and integrated.

Cost: Any customer or partner using the OIP 100 may be able to avoid substantial development costs for the base hardware and software that enables unmanned and manned system integration. By relying on the OIP 100 for this core, a user would benefit from significant development and testing already completed for the OIP 100.

Innovation: Threats, tasks, technologies, and budgets change all the time in the world of unmanned systems, and increased innovation is required to confront such complexity. By utilizing an open system the OIP 100, the user, customer, partner, and stakeholders can rely on a wealth of easily integrated existing technology to help solve problems and reduce complexity much faster, cheaper, and with higher quality than with closed systems.

Figure 2:
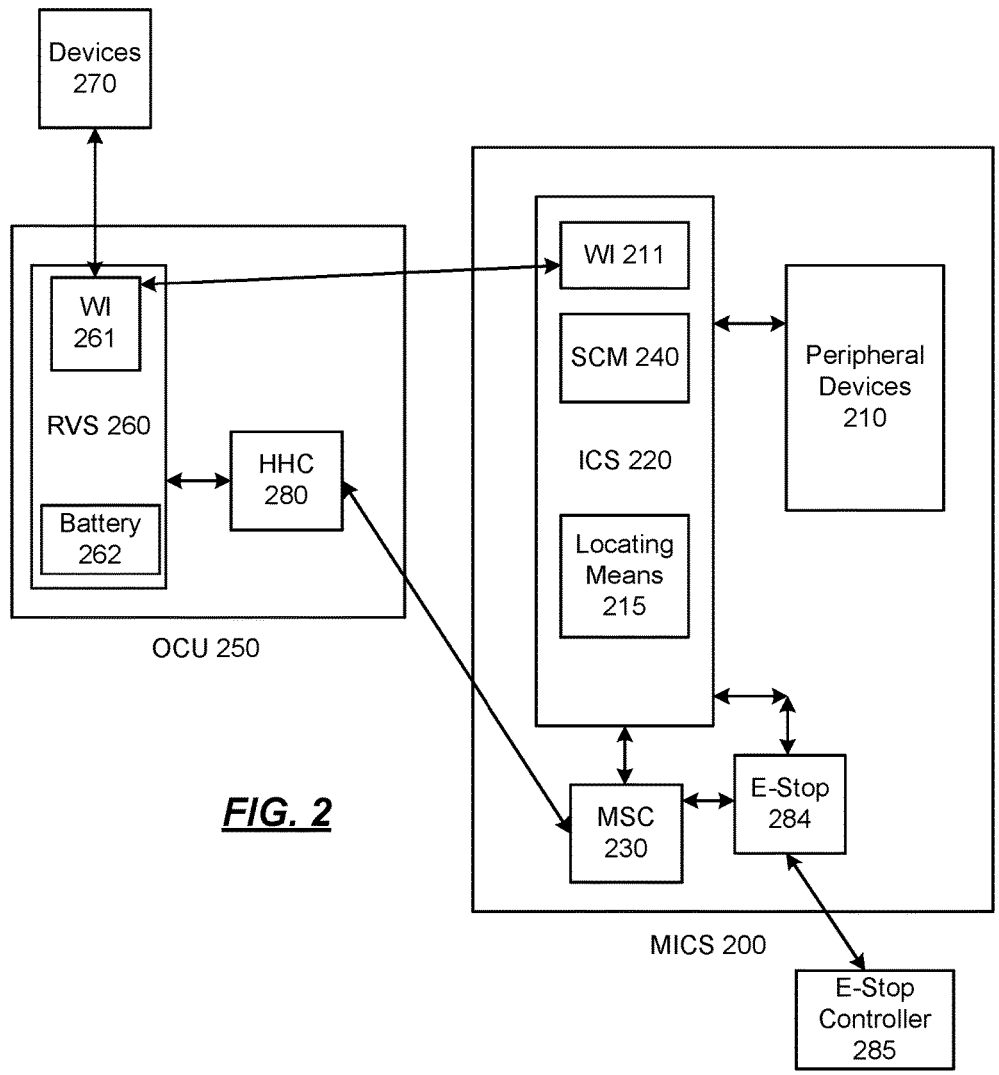
FIG. 2 is a more detailed illustration of the OIP.

FIG. 2 is a more detailed illustration of the OIP 100. In the example shown, the OIP 100 is broken down into two major subsystems: the Machine Integrated Control System (MICS) 200 and the Operator Control Unit (OCU) 250. The MICS 200 may provide a non-destructive means through which one or more users may control a particular machine, may receive information about the machine, or may receive information from or control the operation of one or more peripheral devices 210 associated with the machine. The MICS 200 is non-destructive in that the machine may be operable by an operator even when the MICS 200 is attached or otherwise integrated into the machine, and when the MICS 200 is removed the functions of the machine are not impaired.

The OCU 250, on the other hand, may provide one or more customizable user interfaces through which one or more users may control the machine through the MICS 200. The user interfaces may also be used to view data provided by the MICS 200, or from the peripheral devices 210 associated with the MICS 200. Other components and/or subsystems may be supported. The peripheral device devices 210 may include, but are not limited to, cameras, lights, weapons, and other sensors.

Together, the OCU 250 and the MICS 200 may be used to provide control over a machine such as factory equipment, or an unmanned or manned vehicle, and may allow one or more operators of the machine to view and share data provided by one or more of the peripheral devices 210, or from the machine itself.

In some implementations, the MICS 200 may include a Machine Systems Controller (MSC) 230. The MSC 230 may be adapted to non-destructably interface with a variety of machines such as robots and vehicles using a variety of interfaces and/or control systems such as Drive-by-wire (J1939), Direct-drive electric motors (typically found in small robots), and Hydraulic or mechanical controls. Other systems or interfaces may be supported. The MSC 230 may receive a variety of diagnostic and status information from the vehicle including, but not limited to speed, temperature, oil pressure, fuel level, tire pressure, or any other information supplied by a vehicle in its normal operational state. The MSC 230 may also include one or more integrated sensors such as an accelerometer, a GPS or other location detection means, a magnetometer, a thermometer, and a barometer, for example. Other sensors may also be supported. The MSC 230 may be implemented using a general purpose computing device such as the computing system 1200 described with respect to FIG. 12. An exemplary MSC 230 is described further with respect to FIG. 4.

The MSC 230 may provide such information to one or more users associated with the OCU 250 through a wireless communication means that may be integrated into the MSC (i.e., Bluetooth, Wi-Fi, etc.). Alternatively, or additionally, the MSC may provide such information to one or more smart phones, tablets, or any other devices that are able to receive data via a wireless interface.

For example, an owner of a fleet of construction vehicles may use the OCU 250, or a smart phone associated with the owner, to query a MSC 230 connected to each of the vehicles in the fleet. Each MSC 230 may receive the query and may provide the status information associated with its associated vehicle to the OCU 250. The owner may then use the status information assisted with each vehicle to determine which vehicles may require servicing.

The MSC 230 may also control the operation of the machine through the one or more interfaces. For example, where the machine is vehicle the MSC 230 may control the throttle, brakes, transmission, lights locks, or any other systems of a vehicle that may be controlled electronically through an interface. In some implementations, the MSC 230 may control the operation of the machine based on one or more signals received directly from the OCU 250. In other implementations, the MSC 230 may control the operation of the machine based on one or more signals received directly from an Instrument Control System (ICS) 220 of the MICS 200.

In some implementations, the ICS 220 may include electrical and computer networking components and may interface with, and provide power to, a variety of components including lights, sensors, and cameras (i.e., the peripheral devices 210). The supported computer networking components may include Ethernet (powered or unpowered), USB, Bluetooth, eSATA, or any other type of networking or connecting means. The ICS 220 may receive power from the machine that the ICS 220 is mounted to, or may include its own power source such as a battery or one or more solar panels. In implementations where the ICS 220 receives power from the machine, the ICS 220 may include a fuse or other means to limit the amount of current that is drawn from the machine. Where the machine is a vehicle, the ICS 220 may be attached to the vehicle through a roof mount. Other locations or attachment means may be supported.

The ICS 220 may further include a locating means 215. The locating means 215 may determine the location of the ICS 200, and therefore the location of the machine that the ICS 220 is attached to. Any one of a variety of technologies for determining locations such as GPS, and cellular triangulation may be used.

The ICS 220 may a wireless interface 211. The wireless interface 211 may include one or more radios and may be capable of receiving one or more control signals from the OCU 250. The ICS 220 may further be capable of transmitting data from one or more of the peripheral devices 210 that are connected to the ICS through the one or more radios of the wireless interface 211. The transmitted data may include output from the MSC 230 (e.g., information from and about the machine including speed, oil pressure, temperature, and other diagnostic information), signals from one or more of the peripheral devices 210 connected to the ICS 220 (e.g., video, audio, temperature, and other sensor data), and location information determined by the locating means 215. In some implementations, both the control signals from the OCU 250 and the data signals from the ICS 220 may be received and provided by the same radio and/or frequencies of the wireless interface 211. Alternatively, different radios and/or frequencies may be used for control signals and data signals. In addition, the control and data signals may be encrypted or unencrypted. The ICS 220 may be implemented by a general purpose computing device such as the computing system 1200 described with respect to FIG. 12.

The ICS 220 may further include one or more emergency stops (e-stops) 284. When the ICS 220 receives a signal from the e-stop 284, the ICS 220 may immediately disable the machine by sending the appropriate signal(s) to the MSC 230. For example, in one implementation, the e-stop 284 may be highly visible button that is located inside and/or outside the machine. When the button is pushed, the ICS 220 may signal the MSC 230 to immediately halt or deactivate the machine. For example, where the machine is a vehicle the MSC 230 may apply the brake and/or disengaging the throttle. The particular steps or actions that occur upon engaging an e-stop 284 may be set by a user or administrator. The e-stops 284 may be both wired and wireless. In addition, in some implementations, the e-stop 284 signal may also be received directly by the MSC 230 providing additional safety protection and isolation from the various components of the ICS 220. The e-stops 284 may be integrated into the OIP 100, may be integrated into a third-party control and automation system, or may function as a stand-alone system as will be described further bellow.

In some implementations, each e-stop 284 may be wirelessly controlled by one or more e-stop controllers 285. When a user or operator of the e-stop controller 285 determines that the machine should be stopped, the user may use the e-stop controller 285 to send a stop signal to the e-stop 284 corresponding to the machine. The e-stop 284 may then receive the stop signal, and may instruct the ICS 220 and/or MSC 230 to deactivate the machine.

In some implementations, each e-stop 284 associated with a machine or MICS 200 may have its own associated e-stop controller 285. Alternatively, one e-stop controller 285 may be associated with a variety of e-stops 284 within a selected range of the e-stop controller 285, or are otherwise paired with the e-stop controller 285. For example, a fleet of unmanned vehicles may be used on a construction site. Each vehicle may have a MICS 200 with an associated e-stop 284. One or more foremen associated with the construction site may receive an e-stop controller 285 (a wireless dongle, for example) that is associated with or paired with the e-stops 284 of all the vehicles (or other machines) used on the construction site. If a foreman believes that an accident has occurred or that the safety of a worker is being compromised, the foreman may activate the e-stop controller 285 which will cause each associated e-stop 284 to disengage its associated vehicle.

In another implementation, a user associated with an e-stop controller 285 may select the particular e-stop 284 that it would like to send a stop signal to. For example, the e-stop controller 285 may have a display that includes a list of the e-stops 284 and/or the vehicles or machinery associated with each e-stop 284. A supervisor could use the display of the e-stop controller 285 to choose a specific vehicle or machinery that is behaving in an unsafe manner or may be malfunctioning, and may activate the e-stop 284 associated with that vehicle or machinery only. Such remote e-stop controller 285 functionality could be distributed to multiple individuals with safety responsibility, forming a distributed network of e-stops 284 and e-stop controllers 285. Any individual in this network could choose any machine within the network that they would like to stop using the e-stop controller 285, and activate the e-stop 285 for that vehicle specifically to disengage it. Both the e-stop 284 and e-stop controller 285 may be implemented using a general purpose computing device such as the computing system 1200 illustrated with respect to FIG. 12.

Additional safety features may be integrated into the MSC 230. For example, in some implementations, the MSC 230 may receive what is referred to as heartbeat signal from the ICS 220 that indicates that the IC 220 is receiving signals from OCU 250. If the heartbeat signal is not received by the MSC 230 from the ICS 220, the MSC 230 may immediately shut down or disengage the machine, may gradually slow the machine, may trigger an alarm associated with the machine, and/or may request diagnostic information from the machine. Other actions may be performed. By providing the safety functionality within the MSC 230 rather than the ICS 220, the safety of the machine is not compromised by the particular sensors or peripheral devices 210 that are connected to the ICS 220.

Figure 5:
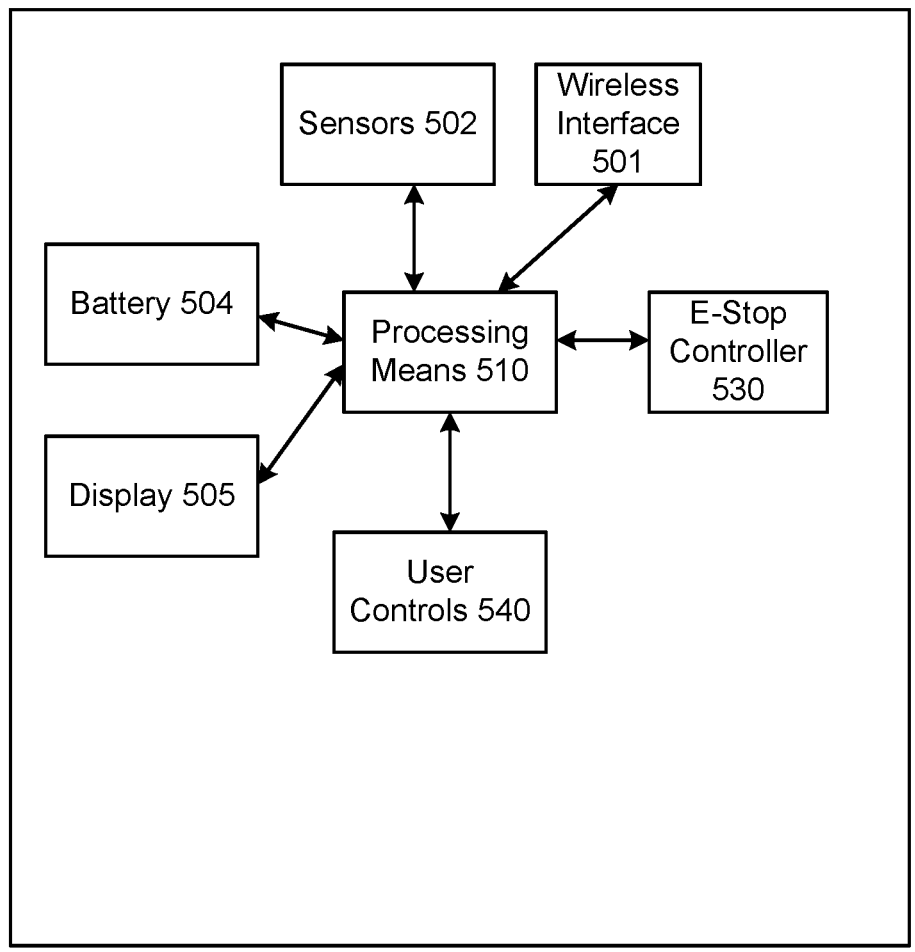
FIG. 5 is an illustration of an example HHC.

The ICS 220 may further include a Shared Control Module (SCM) 240. The SCM 240 may be a computing device (such as the computing system 1200) and may provide the API functionality described herein. The ICS 220 may allow one or more customized control modules to interface with the ICS 220 and the one or more peripheral devices 210 that are connected to the ICS 220 including the MSC 230. Thus, for example, a user may interact with the sensors connected to the ICS 220 using the API provided by the SCM 240. The SCM 240 may then translate the various function calls of the API into the particular format or protocols expected by each peripheral device 210. Similarly, a user may create an application that controls the machine using the API without knowing the particular functions or protocols used by the machine. The SCM 240 may then translate the function calls of the API according to various functions and/or protocols that are expected by the machine. Thus, the SCM 240 provides a layer of abstraction of the machine and peripheral device 210 interfaces that allows a single application to work with a wide variety of machine and peripheral device types.

Where the machine is mobile such as a vehicle, robot, farm equipment, or manufacturing equipment, the OCU 250 may include a hand held controller (HHC) 280. The HHC 280 may be a controller that provides control data or instructions to the ICS 220 and/or directly the MSC 230. In some implementations, the HHC 280 may include one or more analogue control sticks and/or buttons that may be used to control the steering, braking, throttle, and other functionality of the machine. The HHC 280 may further control other operations of the machine including locks, lights, and horn, for example. In some implementations, the HHC 280 may also control the operation of one or more sensors or other peripheral devices 210 of the ICS 220. The HHC may include a GPS, or other location determination means, and may provide the location of the HHC along with any control data to the ICS/MSC. The HHC 280 may be ergonomic, waterproof, and rugged. An example schematic of the HHC is illustrated in FIG. 5. Note that all wireless communication described herein between the OCU 250 and the MICS 200 may be encrypted or otherwise protected.

In addition to the HHC 280, in some implementations, the OCU 250 may further include one or more Remote Viewing Stations (RVS) 260. The RVS 260 may be a rugged portable system allowing one or more users to monitor the ICS 220 and/or MSC 230 remotely. The RVS 260 may include a power source such as a battery 262, and may allow for the charging one or more devices 270 including the HHC 280. The RVS 260 is intended to be easily carried by an operator, or may be stored in a machine (e.g., manned or unmanned vehicle) until needed. The RVS 260 may be implemented using a general purpose computing device such as the computing system 1200 illustrated with respect to FIG. 12.

The RVS 260 may further include a wireless interface 261. The wireless interface 261 may include one or more radios and/or antennas, and may be used to receive data (such as location information, speed, etc.) from the ICS 220 and/or MSC 230 and may make the received data available to one or more devices 270 such as smart phones, tablets, laptops, etc. In some implementations, the RVS 260 may use the wireless interface 261 to create a protected Wi-Fi network that operators may connect to in order to view sensor data on their devices 270. In some implementations, the operators may use their personal devices to control the machine, or to control the operation of one or more sensors or peripheral devices 210 of the ICS 220 and/or MSC 230. The RVS 260 may pass on any commands or instructions received by the RVS 260 to the ICS 220 or MSC 230 depending on the implementation.

The RVS 260 may further include one or more safety features. For example, the RVS may include an e-stop controller 285.

Figure 3:
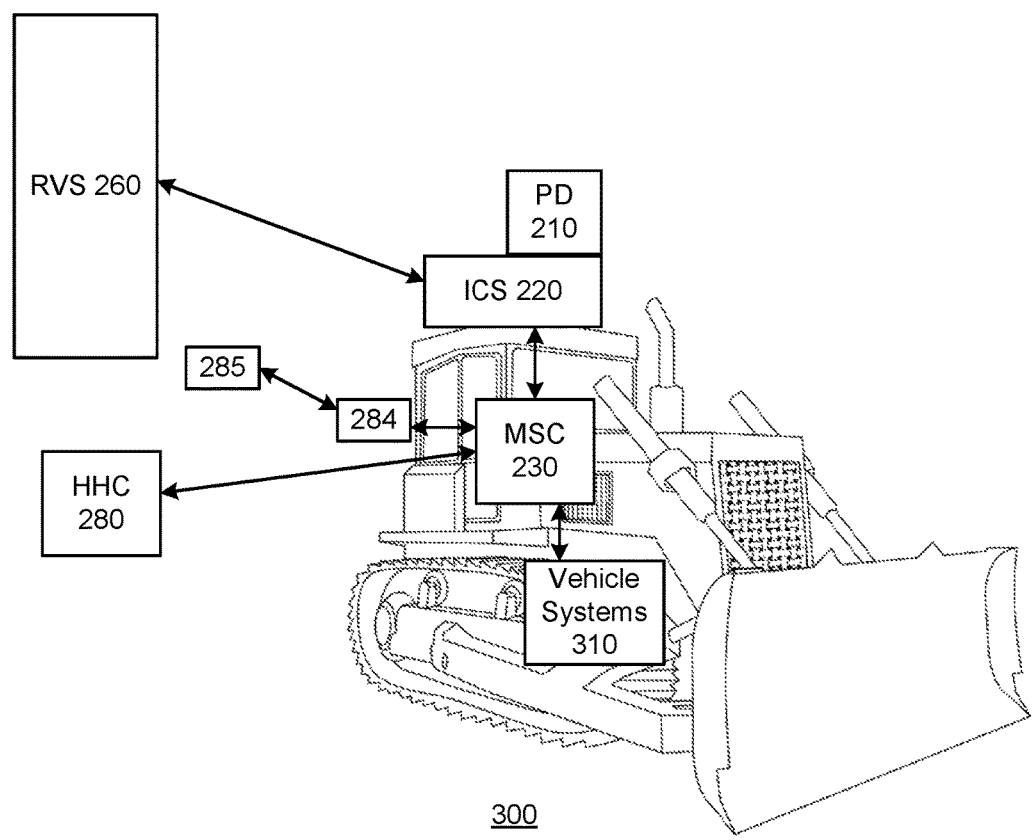
FIG. 3 is an illustration of a vehicle control scenario using the OIP.

FIG. 3 is an illustration of an example scenario where an OCU 250 is used to control a machine such as a vehicle 300 through a MICS 200. In the example shown, the vehicle 300 is a bulldozer. However, a variety of vehicles or other types of machines may be supported and controlled by the MICS 200 and/or MSC 230.

The vehicle 300 includes a vehicle system 310 that is connected to the MSC 230 of the MICS 200. The vehicle system 310 may be a drive by wire system, and may include an interface such as a 50 pin signal connector through which the MSC 230 may provide commands to the vehicle 300, and may receive information from the vehicle such as speed, oil pressure, fuel level, engine temperature, etc. The MSC 230 may provide commands to the vehicle systems 310 to activate various controls associated with the vehicle 300 including lights, throttle, and brakes, for example.

The MSC 230 may receive operating instructions from the HHC 280, and may provide the instructions to the vehicle systems 310. Alternatively, or additionally, the MSC 230 may receive instructions from one or more devices associated with the RVS 260. For example, an operator of the HHC 280, may use a stick or control pad associated with the HHC 280 to cause the vehicle 300 to turn left. The HHC 280 may then provide a corresponding command wirelessly to the MSC 230. The MSC 230 may generate a command that may cause the vehicle system 310 to turn left, and may provide it to the vehicle systems 310. The vehicle 300 may then turn left.

The MSC 230 may provide the status information from the vehicle systems 310 to the ICS 220. As shown the ICS 220 may be attached to the roof or exterior of the vehicle to maximize the wireless range of the ICS 220. The ICS 220 may then provide the status information to the RVS 260 where the status information may be displayed or made available by the RVS 260.

In addition, the ICS 220 may determine a location of the vehicle 300, and may receive data from one or more peripheral devices 210 attached to the ICS 200, such as a camera. The location, peripheral device 210 data, and MSC 230 data may be provided to the RVS 260 where the data may be viewed by an operator of the RVS 260 and/or one or more devices 270.

For example, the RVS 260 may receive the current speed and location of the vehicle 300 from the MSC 230, along with video from a video camera peripheral device 210 mounted on the top of the vehicle 300. An operator of the RVS 260 may view a map that indicates the location of the vehicle 300, along with the video received from the peripheral device 210. In addition, the locations of other vehicles 300 may also be displayed on the map, and the operator may use the RVS 260 (or other connected device 270) to select the vehicle 300 whose video data the operator desires to view.

The MICS 200 also includes an e-stop 284. The e-stop 284 may be placed on the outside of the vehicle 300 so that an operator may manually activate the button or switch associated with the e-stop to halt the vehicle 300. When activated the e-stop 284 may send a signal to one or both of the ICS 220 and MSC 230 to cause the vehicle 300 to be immediately stopped.

In addition, the OCU 250 includes a corresponding e-stop controller 285 that can be used to halt the vehicle 300. The e-stop controller 285 may be a standalone device or may be integrated into some of all of the HHC 280 and the RVS 260. An operator may activate the e-stop controller 285 and the controller 285 may provide a stop signal that is received directly by the e-stop 284 or indirectly by either the MSC 230 or the ICS 220. In response to receiving the stop signal the vehicle 300 may halt as if the corresponding switch on the e-stop 284 had been activated.

Depending on the implementation, e-stop controller 285 and the e-stop 284 may include additional safety and/or failsafe features. For example, the e-stop 284 may monitor the state of the wireless (or wired) connection between them. Should the e-stop 284 detect that the connection has been severed; the e-stop 284 may immediately halt the operation of the vehicle 300 as if the e-stop controller 285 had issued a stop command. Should the wireless connection be restored, the e-stop 284 may reactivate the vehicle 300. Alternatively, or additionally, rather than stop the vehicle (or other associated machine) the e-stop 284 may take another action such as sounding an alarm, reducing the speed of the vehicle, or some other action that may be specified by a user or administrator. The wireless connection based failsafe may be implemented in hardware or software, for example As another level of failsafe, the e-stop 284 may periodically receive a heartbeat signal from the e-stop controller 285. Should the e-stop 284 not receive the heart beat signal from the e-stop controller 285 within a defined time interval, the e-stop 284 may deactivate the vehicle 300, or may take some other action or actions that may be specified by a user or administrator.

In addition, the e-stop 284 may also send a heartbeat signal to the e-stop controller 285. Should the e-stop controller 285 not receive the signal, the controller 285 may send a stop signal, and then may deactivate the wireless connection between the e-stop controller 285 and the e-stop 284. Should the e-stop 284 not receive or understand the stop signal because of a software malfunction, deactivating the wireless connection will cause the e-stop 284 to deactivate the vehicle 300 (or other associated machinery). Alternatively, the e-stop controller 285 may deactivate the wireless connection without sending the stop signal, which will similarly result in the e-stop 284 deactivating the vehicle 300.

In some implementations, rather than disable the wireless connection after sending the stop signal, the e-stop controller 285 may maintain the wireless connection between the e-stop 284 and the e-stop controller 285. By maintaining the wireless connection, the controller 285 may request and/or receive diagnostic information from the e-stop 284 to determine why the heartbeat signal has not been received, for example.

Figure 4:
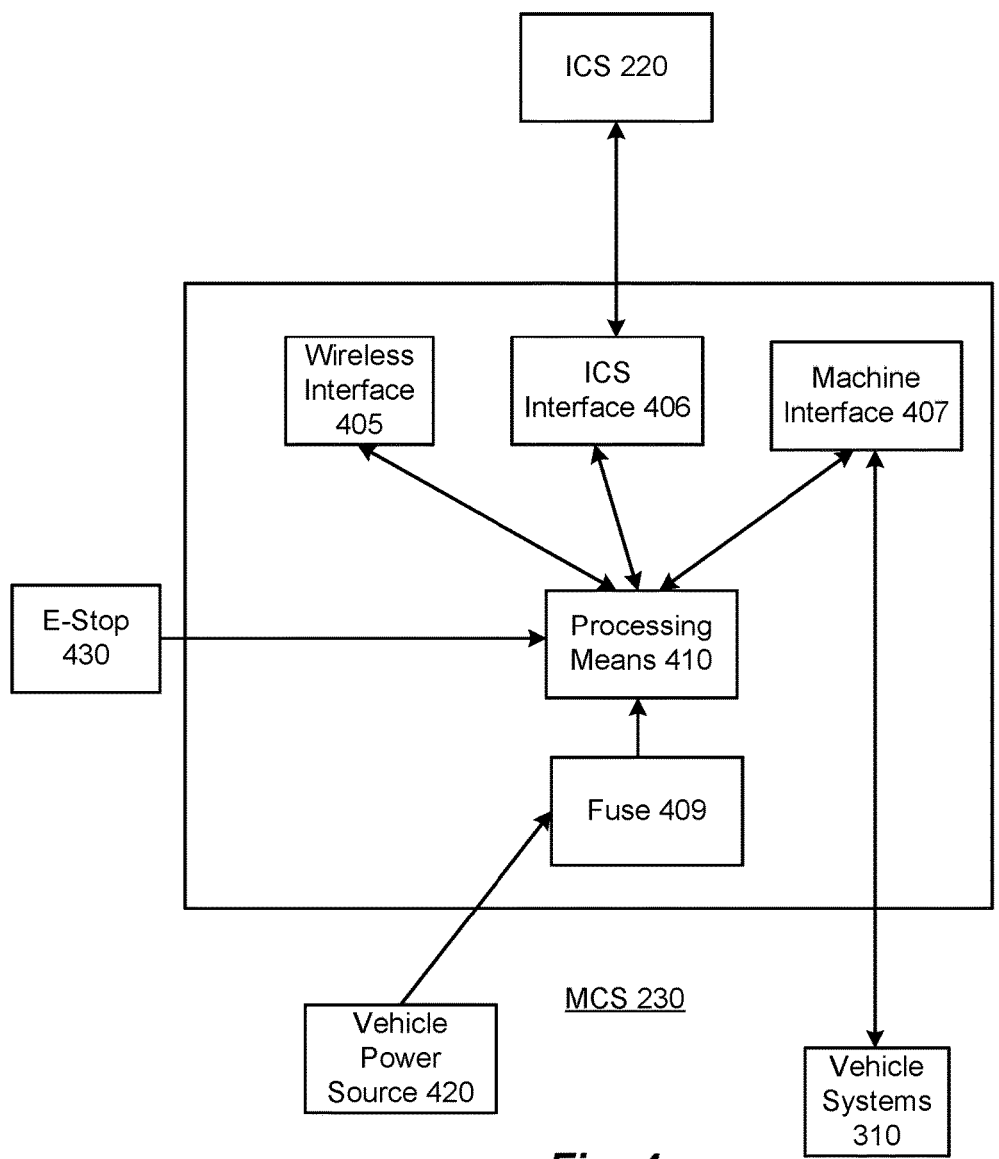
FIG. 4 is an illustration of an example MSC.

FIG. 4 is an illustration of an example MSC 230. As shown, the MSC 230 includes several components including a processing means 410, wireless interface 405, an ICS interface 406, a machine interface 407, and a fuse 409. More or fewer components may be supported.

The machine interface 407 may allow the MSC 230 to send data to, and receive data from, the vehicle systems 310 (or more generally the systems associated with a machine other than a vehicle). The data that the MSC 230 sends to the vehicle systems 310 may be control data such as instructions to apply brakes, increase or decrease speed, steering instructions, and instructions to turn on one or more lights. The received data may include status data such as information about an amount of remaining fuel and other diagnostic information about the vehicle. In some implementations, the machine interface 407 may be a 50 pin connector. However, other types of wired or wireless interfaces may be used.

The ICS interface 406 may allow the MSC 230 to send data to, and receive data from, the ICS 220. As described previously, in some implementations, the ICS 220 may be externally mounted to the vehicle and may include one or more peripheral devices 210 such as cameras or other sensors. In addition, the ICS 220 may receive control commands or instructions from one or more of the HHC 280 or the RVS 260, and may also provide information to the RVS 260 and/or HHC 280 regarding the status of the associated vehicle and data from the peripheral devices 210. Accordingly, the ICS interface 220 may allow the ICS 220 to pass any received control commands to the MSC 230, as well as the MSC 230 to provide any requested status information received from the vehicle systems 310 to the ICS 200. In some implementations, the ICS 406 may be a 24 pin signal connector. However, other types of wired or wireless interfaces may be used.

The wireless interface 405 may receive and/or transmit data to one or more of the RVS 260 and the HHC controller 280. The received data may include control instructions from the HHC controller 280 and/or the RVS 260. The transmitted data may include status information from the vehicle systems 310, sensor information, and location information, for example. The wireless interface 405 may include one or more antennas and may support a variety of standards, protocols, and frequencies such as Wifi, cellular, Bluetooth, 1.3 GHz, 2.4 Ghz, 5.8 GHz, and 900 MHz. In some implementations, the control signals may be received using a different frequency and/or antennae than is used to send status information. Depending on the implementation, the wireless interface 405 may be implementation using a wire or a wire-based standard or protocol.

The processing means 410 may execute software that manages and routes data to and from the various components of the MSC 230. For example, the processing means 410 may receive control instructions from one or more of the ICS interface 406 and/or wireless interface 405 and may pass the control instructions to the vehicle systems 310 via the vehicle interface 407. Similarly, the processing means 410 may provide status data received from the vehicle systems 310 via the vehicle interface 407 to one or more of the wireless interface 405 and the ICS interface 406. When routing data to and from the various components of the MSC 230 the processing means may transform or format the data into whatever formats are expected or supported by the receiving components. The processing means 410 may include a processor and memory.

The processing means 410 may further interface with an e-stop 284. The e-stop 284 may generate a stop signal that is received by the processing means 410. Upon receipt of the stop signal, the processing means may instruct the vehicle systems 310 via the vehicle interface 407 to immediately halt the vehicle. Alternatively, or additionally, the e-stop 284 may generate a heartbeat signal that is received by the processing means 410. In the event that the heartbeat signal ceases (either because the e-stop 284 has been activated or malfunctioned) the processing means 410 may instruct the vehicle systems 310 via the vehicle interface 407 to immediately halt the vehicle.

The processing means 410 may further receive power through the fuse 409, and may distribute the power to the various components of the MSC 230 via a bus. The fuse 409 may receive power from a vehicle power source 420 associated with the vehicle. The power may be received via a 4 pin power connector; however other connectors or connector types may be used. The fuse 409 may limit the amount of power that the MSC 230 may draw from the vehicle or machine at any time thereby preventing the MSC 230 from inhibiting the amount of power that is available to the vehicle. In some implementations, the power from the fuse 409 may be further distributed to the ICS 220 via the ICS 406 interface.

While not shown, the MSC 230 may include additional components or sensors such as an accelerometer, a GPS, or other location determination means. In addition, the MSC 230 may include a battery or other power source that is independent of the machine power source 420.

FIG. 5 is an illustration on an example HHC 280. As shown the HHC 280 include one or more components including, but are not limited to a wireless interface 501, sensors 502, battery 504, display 505, user controls 540, an e-stop controller 530, and a processing means 510. More or fewer components may be supported.

The wireless interface 501 may receive and/or transmit data to one or more of the ICS 220 and the MSC 230. As described above, the HHC 280 may be used by an operator to control a vehicle (or other machine) via one or more of the ICS 220 and the MSC 230. The received data may include status information from the vehicle systems 310, location information associated with the machine, sensor data, and peripheral device 210 data, for example. The transmitted data may include control data and other instructions generated by the operator of the HHC 280. The wireless interface 501 may include one or more antennas and may support a variety of standards, protocols, and frequencies such as Wifi, cellular, Bluetooth, 2.4 GHz, 5.8 GHz, and 900 MHz. In some implementations, the control signals may be sent using a different frequency and/or antennae than is used to receive status information or peripheral device 210 data. Depending on the implementation, the wireless interface 501 may be implementation using a wire or a wire-based standard or protocol.

The HHC 280 may include user controls 540. The user controls 540 may include a variety of input means such as buttons and joysticks. The input means may be digital, analogue or some combination of both. The input means may be mapped to variety of vehicle systems 310 and controls such as throttle, brakes, and steering. In addition, one or more of the input means may be mapped to one or more peripheral devices 210 such as lights, camera, or weapons systems. The particular mapping of the user controls to the vehicle systems 310 and/or peripheral devices 210 may be customized by an operator or administrator, for example.

The HHC 280 may further include a display 505. The display 505 may be used to display data received by the HHC 280 from the ICS 220 and/or the MSC 230. For example, the MSC 230 may provide the HHC 280 with information about the vehicle such as speed, temperature, and location. The HHC 280 may display the information to an operator on the display 505. Alternatively, or additionally the HHC 280 may receive video data from a peripheral device 210 of the ICS 220 and may display the video data to the operator on the display 505. The display 505 may include a variety of display types including LCD and OLED. Other types of displays may be used.

The HHC 280 may include a variety of sensors 502. The sensors 502 may include a variety of sensor types including a location determination means such as a GPS, an accelerometer, a gyroscope, thermometer, impedance sensor, camera, fingerprint reader and a light sensor. Other types of sensors may be used. The data from the sensors 502 may be used to implement various safety and security related features.

For example, the sensors 502 may be used to determine if an operator is currently holding the HHC 280. For example, a sudden large acceleration detected by an accelerometer may indicate that the HHC 280 has been dropped. Similarly, because operators do not typically stand completely still, there is an expected amount of background movement or acceleration that is associated with being held still by an operator. If no acceleration is detected, or the detected acceleration is otherwise outside of this expected amount, then the user may have either placed the HHC 280 down or may otherwise be impaired. If any of the above conditions are detected, then the HHC 280 may be deactivated, or the HHC 280 may send the ICS 220 or MSC 230 a signal to deactivate the vehicle.

In another example, a gyroscope sensor or magnetometer of the HHC 280 may detect the orientation of the HHC 280 and may deactivate the HHC 280 if the orientation is outside of an acceptable range. For example, if the HHC 280 is in an orientation that implies that the operator is lying down, upside down, or in any other unacceptable operating position, the HHC 280 may be deactivated. The ICS 220 and/or MSC 230 may be similarly also be deactivated as a result of the HHC 280 deactivation. The camera, light sensor, and/or impedance sensor may similarly be used to determine if the HHC 280 is being held by a user.

With respect to security, the camera, fingerprint reader, and impedance sensor, alone or in combination, may be used to authenticate an operator of the HHC 280. If an operator is not an authorized operator, or otherwise cannot be authenticated, the HHC 280 may be disabled along with the associated vehicle.

The processing means 510 may execute software that manages and routes data to and from the various components of the HHC 280, as well as perform any processing related to the display 505, sensors 502, and user controls 540. For example, the processing means 510 may receive indications of one or more button actuations from the user controls 540, may determine corresponding commands and/or instructions. These instructions may be then provide to the wireless interface 501 for transmission to the ICS 220 and/or MSC 230. Similarly, the processing means 510 may receive location or video data from the ICS 220, and may format or process the received data into a format that is suitable for display on the display 505. The processing means 510 may further implement the various safety and authentication features described above.

The processing means 510 may further interface with an e-stop controller 530. The e-stop controller 530 may be mapped to a particular button or switch of the user controls 540, and when actuated may cause a stop signal to be sent to the processing means 510. Upon receipt of the stop signal, the processing means 510 may send a corresponding stop signal or instruction via the wireless interface 510 to an associated e-stop 284 of the controlled vehicle. Depending on the implementation, the e-stop controller 530 may include its own processing means and wireless interface so that the other operations of the HHC 280 do not impede or interfere with the operation of the e-stop controller 530.

Figure 6:
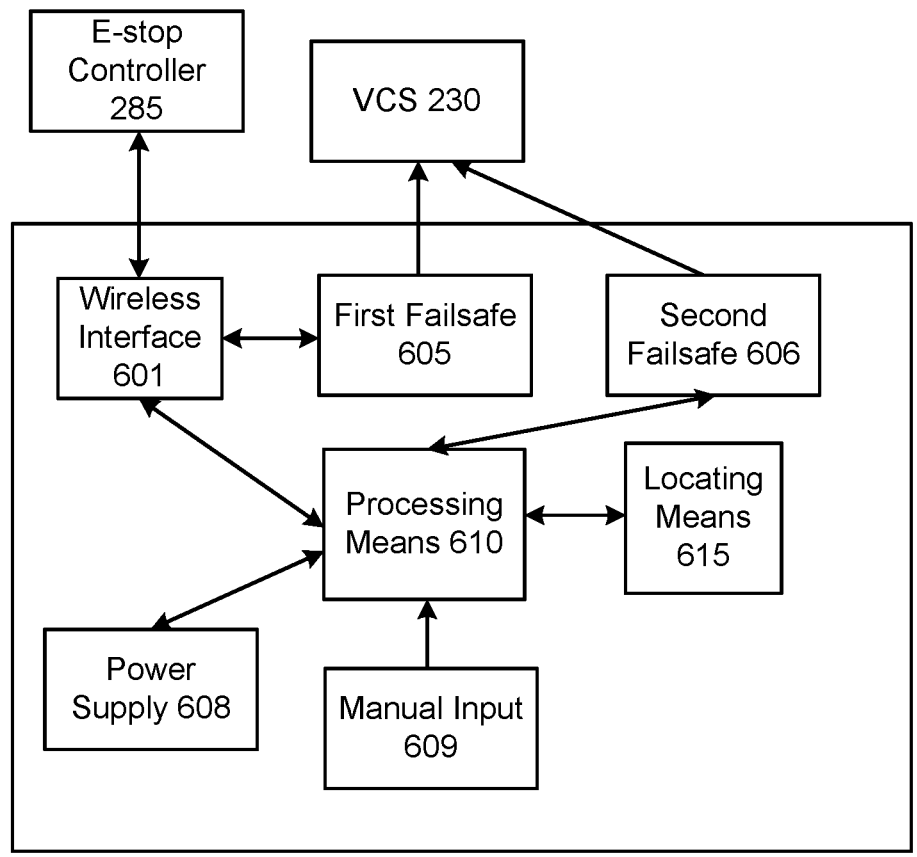
FIG. 6 is an illustration of an example e-stop.

FIG. 6 is an illustration of an example e-stop 284. The e-stop 284 may include a plurality of components including a wireless interface 601, a first fail safe 605, a second failsafe 606, a processing means 610, a locating means 615, a power supply 608, and a manual input 609. More or fewer components may be supported. As described above, an e-stop 284 may be paired with a vehicle, manufacturing device, or other machinery, and may allow one or more users to immediately stop the operation of the paired machinery or vehicle by activating either a button or switch attached to the e-stop 284, or through one or more wireless (or wired) e-stop controllers 285. The e-stop 284 may halt the operation of a vehicle or machinery by sending a stop signal, or whatever action or actions have been associated with the receipt of a e-stop signal by a user or administrator, for example.

The e-stop 284 may include a wireless (or wired) interface 601. The wireless interface may include at least one antenna or radio and may be used to receive data from an e-stop controller 285. A variety of communication standards, protocols, and frequencies such as Wifi, cellular, Bluetooth, 1.3 GHz, 2.4 Ghz, 5.8 GHz, and 900 MHz may be supported by the wireless interface 601. In some implementations, the e-stop 284 may periodically send a heartbeat signal to the e-stop controller 285 indicating that the e-stop 284 is operating correctly.

To prevent malfunction of the e-stop 284, the e-stop 284 may include a two stage failsafe system. The system may include the first failsafe 605 and the second failsafe 606. The first failsafe 605 may determine whether there is an active connection with the e-stop controller 285 and the e-stop 284. If at any time the wireless connection between the e-stop controller 285 and the e-stop 284 fails or is interrupted, the first failsafe 605 may trigger the stop signal to halt the vehicle or machinery. Other actions may be specified by a user or administrator. The first failsafe 605 and the second failsafe 606 may be each implemented together or separately using any combination of hardware or software.

The second failsafe 605 may monitor the received signal for one or more of a heartbeat signal and a stop signal from the e-stop controller 285. If the stop signal is received the second failsafe 606 may trigger the stop signal to halt the vehicle or machinery. The heartbeat signal may signify that the e-stop controller 285 is operating correctly, thus if the heartbeat signal ceases to be received from the e-stop controller 285, the second failsafe 605 may similarly trigger the stop signal to halt the vehicle or machinery.

As may be appreciated, the first failsafe 605 may allow the e-stop controller 285 to stop the associated vehicle or machinery even where the software failsafe 606 has failed. For example, the e-stop controller 285 may stop receiving the heartbeat signal from the e-stop 284. Because the heartbeat signal is not being received, there may be a software malfunction of the first failsafe 606 that is preventing the heartbeat signal from being generated. However, because there is a software error, even if the e-stop controller 285 were to send a stop signal to the second failsafe 606, there is a risk that the second failsafe 606 may not respond correctly. Accordingly, rather than, or in addition to sending the stop signal, the e-stop controller 285 may deactivate the wireless connection between the e-stop controller 285 and the e-stop 284. The deactivation of the wireless connection will be detected by the first failsafe 605, and may cause the first failsafe 605 to trigger the stop signal to halt the vehicle or machinery.

The processing means 610 may execute software that manages and routes data to and from the various components of the e-stop 284, as well as perform any processing related to the first and second failsafes.

The locating means 615 may determine a current location of the e-stop 284. The locating means 615 may be implemented using a variety of location determination technologies including GPS. The processing means 610 may use the determined location to perform some additional safety functionality. For example, the e-stop controller 285 may periodically transmit its location to the e-stop 284. The processing means 610 may compare the location of the e-stop controller 285 with the location of the e-stop 284 and may determine if they exceed a minimum separation distance. And if so, the processing means 610 may trigger the stop signal to halt the vehicle or machinery. Alternatively, the e-stop 285 may provide its location to the e-stop controller 285, and the e-stop controller 285 may determine if the maximum distance has been exceeded.

The e-stop 284 may further include the power supply 608. The power supply 608 may be a battery, or may be power received from the associated vehicle or machinery, for example. Any type of battery may be used. In some implementations, the e-stop 284 may trigger the stop signal to halt the vehicle or machinery should the remaining battery fall below a threshold.

The e-stop 284 may further include a manual input 609. The manual input 609 may be a button, switch or other input means. When actuated, the manual input 609 may trigger the stop signal to halt the vehicle or machinery. The manual input may be implemented using hardware to prevent malfunction in the event of a software failure.

Figure 7:
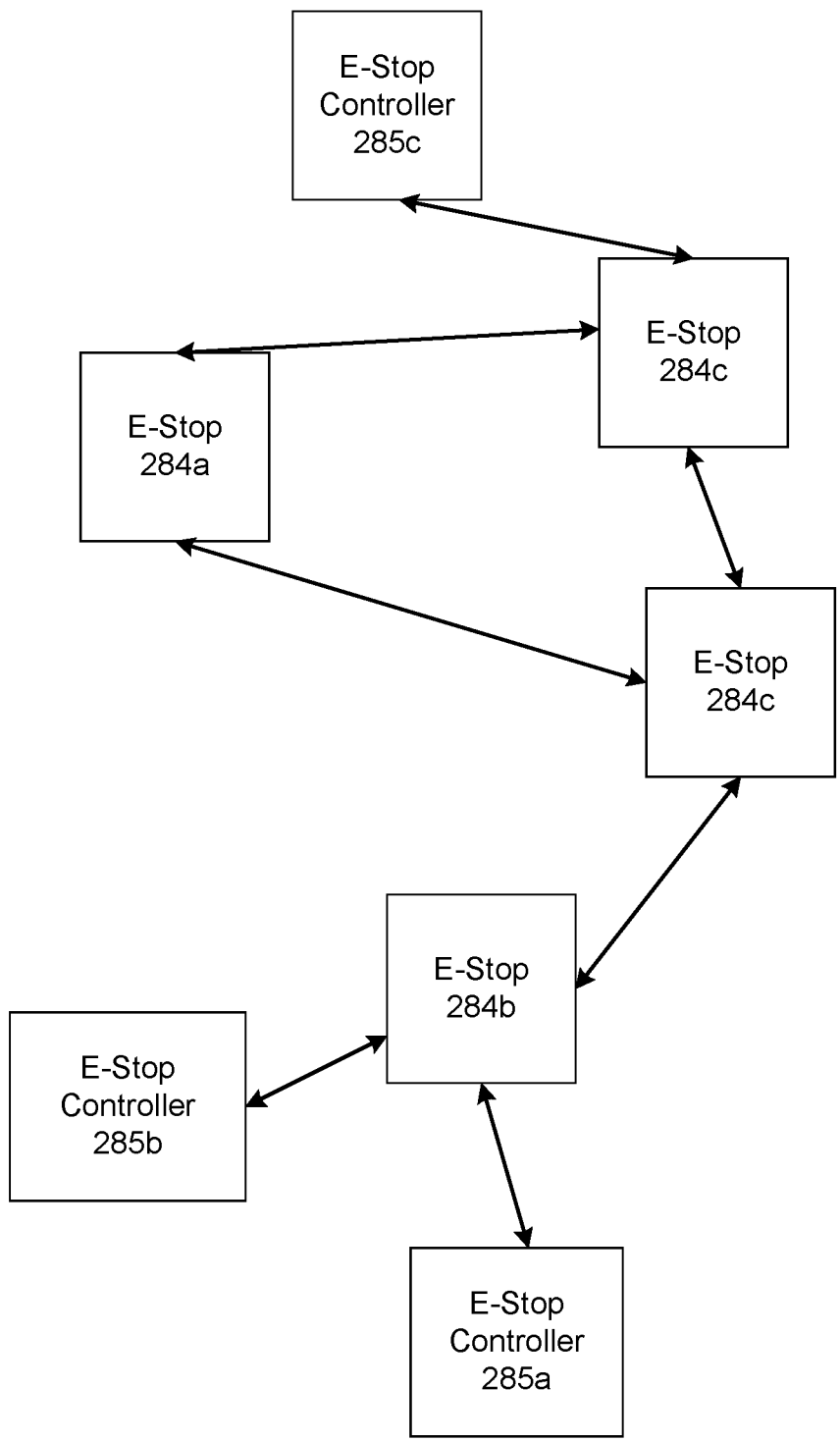
FIG. 7 is an illustration of an example mesh network formed by e-stops and e-stop controllers.

FIG. 7 is an illustration of a system of distributed e-stops 284 and e-stop controllers 285. As shown the system includes a plurality of e-stops 284*a-d* (collectively referred to as e-stops 284) and a plurality of e-stop controllers 285*a-c* (collectively referred to as e-stop controllers 285). While only four e-stops 284 and three e-stops controllers 285 are shown, it is for illustrative purposes only. There is no limit to the number of such devices that may be supported.

As shown, together, the e-stops 284 (and e-stop controllers 285) may form a mesh wireless network. When an e-stop controller 285 desires to send a signal (such as a stop signal) to particular e-stop, the controller 285 may send it to any available e-stop 284, which may then forward the signal to the specified e-stop 285. For example, a user of the e-stop controller 285*c* may wish to stop the machinery associated with the e-stop 284*c*. Depending on the implementation, the user may select the e-stop 284*c* from a list of e-stops 285 on a display associated with the e-stop controller 285*c*, or may actuate an input of the e-stop controller 285*c* that has been mapped to the e-stop 284*c*. After selecting the e-stop 284*c*, the stop signal may be sent to the e-stop 284*d* because that is the closest e-stop 284 to the e-stop controller in the mesh network. The e-stop 284*d* may then forward the signal to the e-stop 284*c*, which may then halt or stop its associated machinery or vehicle. Any system method or technique for mesh networking may be used.

In some implementations, each e-stop controllers 285 may be paired with one or more of the e-stops 284 and may only halt the machinery or vehicle associated with an e-stop 285 that is paired with. Alternatively, one or more of the e-stop controllers 285 may stop any of the e-stops 284 that are available. The e-stop controllers 285 may be manually paired with a particular e-stop 284 by a user or administrator. Alternatively, the e-stop controllers 285 may automatically be paired with the e-stops 284 that they are closest to based on location data associated with the e-stop controllers 285 and the e-stops 284.

In another implementation, a master e-stop controller 285 may be provided. The master e-stop controller 285 may override the stop signal sent by the other e-stop controllers 285, and may therefore restart a halted vehicle or machinery. The master e-stop controller 285 may also be able to stop any available e-stop 284 on the network. The master e-stop controller 285 may automatically pair with a closest available mesh network. For example, a foreman may oversee several factories or construction sites. When the foreman visits a site or floor his or her controller 285 may discover the network of e-stops 284 at the site or floor and may immediately be able to halt any of the machines associated with the e-stops 284

In another implementation, the e-stop controllers 285 may be classified as either primary or secondary e-stop controller 285. Each e-stop 284 may determine, based on location information, if it is within a minimum distance of any secondary e-stop controller 285. If not, the e-stop 284 may halt its associated machinery. Whereas the primary controller 285 may not be subject to such distance requirements.

For example, workers on a factory floor may be each assigned a secondary e-stop controller 285, while a foreman on the floor is assigned a primary e-stop controller 285. Each of the floor workers is tasked with overseeing a particular piece of machinery therefore the e-stops 284 may determine that at least one secondary e-stop controller 285 is within a monitoring distance of the machinery. On the other hand, the foreman may desire to be able to stop the operation of a piece of machinery while on the factory floor, but it is not crucial that he or she always be on the floor or within a particular distance of the e-stops 284.

Figure 8:
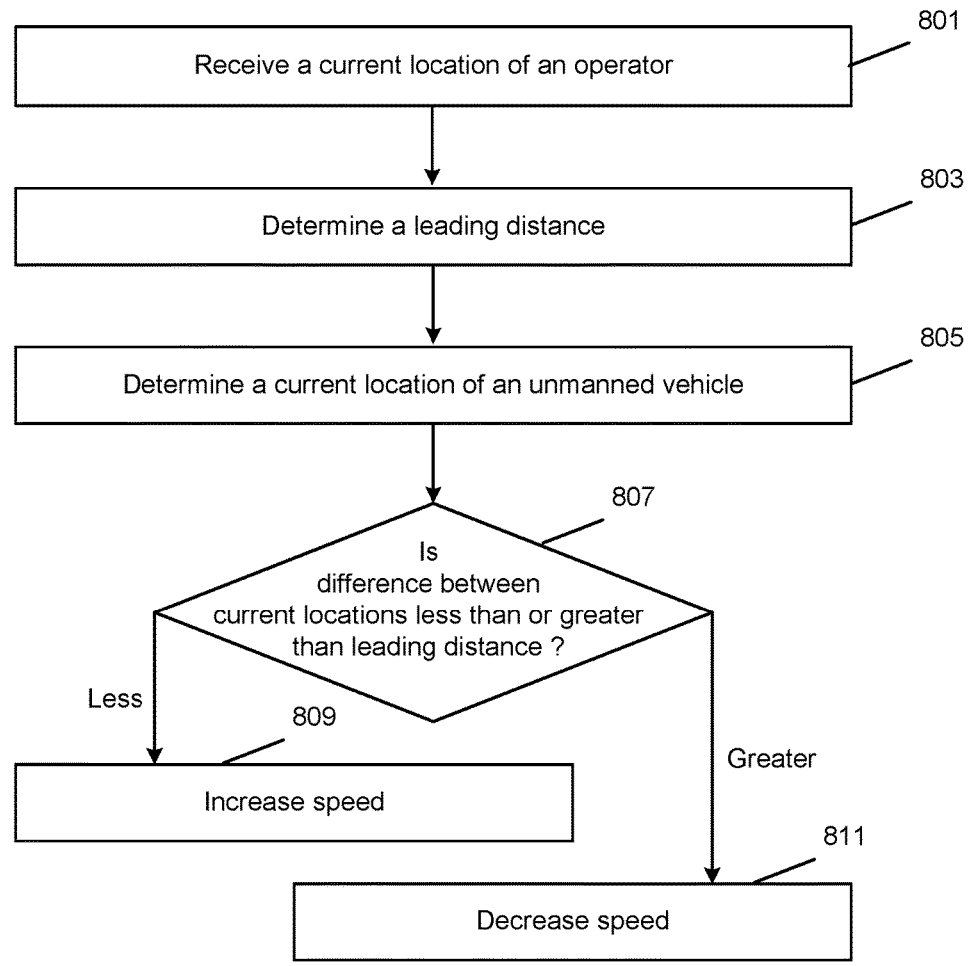
FIG. 8 is an illustration of an example method for increasing or decreasing a speed of a vehicle based on a leading distance.

FIG. 8 is an illustration of a method 800 implementing semi-autonomous navigation of an unmanned vehicle using the OIP 100. The method 800 may automatically control the throttle of the unmanned vehicle allowing the user to focus on steering the unmanned vehicle or on operating one or more peripheral devices 210. Because the user is not controlling the throttle, the functionality of the HHC 280 may be integrated into binoculars, or into a weapon such as rifle. For example, such an HHC 280 may be incorporated into a weapon using a single joystick allowing the user to have their weapon engaged while still controlling the unmanned vehicle. A screen may be provided on the weapon to display received video data from the ICS 220 associated with the vehicle to further assist the user in the control of the vehicle or to identify upcoming threats. The method 800 may be implemented by the ICS 220 and MSC 230 associated with a unmanned vehicle in conjunction with either the HHC 280 or the RVS 260.

At 801 a current location of an operator may be determined. The operator may be operating the HHC 280 and the current location may be determined by a GPS or other locating means associated with the HHC 280. The operator of the HHC 280 may be following the vehicle that is being controlled by the HHC 280. For example, the operator may be in a different vehicle, or may be walking.

At 803 a leading distance between the operator and the unmanned vehicle may be determined. The leading distance may be the desired distance that may be maintained between the unmanned vehicle and the operator. The leading distance may be randomly determined or selected (to confuse possible threats), or may be a fixed distance.

At 805 a current location of the vehicle is determined. The current location may be determined by the locating means associated with either the ICS 220 or the MSC 230.

At 807 a determination is made as to whether the distance between the current location of the operator and the unmanned vehicle is less than or greater than the leading distance. If the difference is less than the leading distance, then the MSC 230 or the ICS 220 may increase the speed of the vehicle at 807. If the difference is greater than the leading distance, then the MSC 230 or the ICS 220 may decrease the speed of the vehicle at 809.

Figure 9:
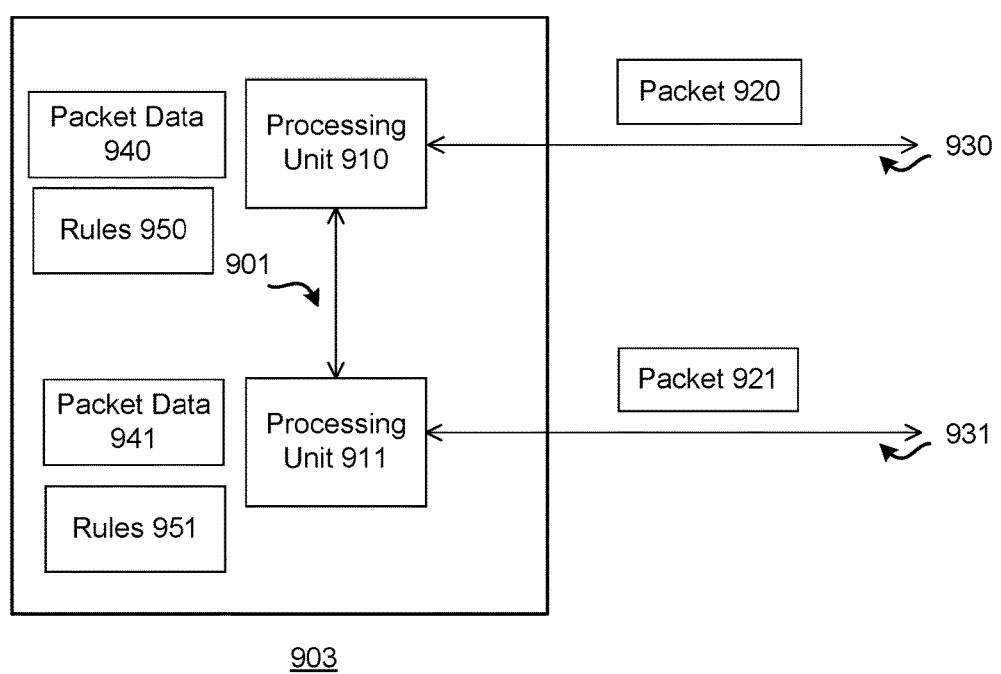
FIG. 9 is an illustration of an example multipath failsafe.

FIG. 9 is an illustration of an example multipath failsafe 903 in accordance with the present invention. The multipath failsafe 903 may be used in place of, or in addition to, the first failsafe 605 and second failsafe 606 described previously. The multipath failsafe 903 may be integrated into one or more of the e-stop controller 285, MCS 230, and HHC 280, described herein.

As shown, the multipath failsafe 903 include a processing unit 910 and a processing unit 911. Each of the processing units 910 and 911 may be implemented using hardware, software, or a combination of both. In one implementation, each of the processing units 910 and 911 may be implemented using a microcontroller, or by a core or cores of a multi-core processor.

Each processing unit may receive and transmit packets on a respective path. As shown the processing unit 910 may receive and transmit packets 920 over a path 930 and the processing unit 911 may receive and send packets 921 over a path 931. Each path 930 and path 931 may represent a wired or wireless connection with a different multipath failsafe of another e-stop controller 285, HHC 280, MCS 230, etc. Depending on the implementation, where the paths 930 and 931 are wireless connections the paths may be implemented using different frequencies (e.g., 1 GHz, 2.4 GHz, 5 GHz, etc.), or may be implemented using different channels of a same frequency. As may be appreciated, by using different channels or frequencies for each path, the likelihood that at least one of the packets 920 and 921 will be transmitted or received in the presence of wireless interference.

Depending on the implementation, the packets 920 and 921 generated by the processing units 910 and 911 may include various information about the multipath failsafe 903 (or machine or other device associated with the multipath failsafe 903). For a generated or transmitted packet, the information may include safety information such as a status of an e-stop associated with the multipath failsafe 903 (i.e., activated, not activated, on, off, etc.) or a heartbeat signal associated with either the processing unit 910 or processing unit 911. For a received packet, the information may include safety information from a different multipath failsafe 903 that transmitted the particular packet. For example, the packet may include a heartbeat signal of the different multipath failsafe 903 or an e-stop status of the different multipath failsafe 903.

Depending on the implementation, each packet 920 or 921 may include an identifier of the multipath failsafe 903 that generated or is associated with the packet. Other information may be included in the packet such as a sequence number associated with a heartbeat signal, a time when the packet was created or transmitted, an identifier of the multipath failsafe 903 that generated the packet, and an identifier of the multipath failsafe 903 that is to receive the packet. Other information may be included in the packet. With respect to the sequence number associated with the heartbeat signal, this number may be a monotonously increasing sequence value. Each packet 920 and 921 may be encrypted using a key associated with either the sending or receiving multipath failsafe 903.

In some implementations, to provide failover and redundancy, each of the processing units 910 and 911 may perform substantially similar tasks with respect to the multipath failsafe 903. In particular, the processing unit 910 and 911 may each generate a packet (i.e., the packets 920 and 921, respectively) that includes a heartbeat signal for the multipath failsafe 903. Similarly, in response to a status change of an e-stop (i.e., active or inactive), the processing units 910 and 911 may generate packets that indicate the change in the e-stop status. Alternatively, each packet 920 and 921 may include a status of an associated e-stop regardless of whether or not the status has changed. Because the packets 920 and 921 are each transmitted over different paths (i.e., the paths 930 and 931, respectively), the likelihood that both of the packets 920 and 921 will be lost or delayed is reduced.

To provide further redundancy and failover, the processing unit 910 and the processing unit 911 may communicate through a path 901 to determine whether not they agree on the status of the multipath failsafe 903 (or one or more other associated multipath failsafes). For example, the processing unit 910 may communicate to the processing unit 911 (and vice versa) when the last heartbeat signal was received for a particular multipath failsafe, or what the e-stop status is for a particular multipath failsafe. Depending on the implementation, the processing units 910 and 911 may continuously communicate to each other over the path 901, at regular intervals, or in response to a status change (e.g., e-stop status change).

How the multipath failsafe 903 reacts to a disagreement between the processing unit 910 and the processing 911 may depend on one or more of rules 950 and 951, as well as collected packet data 940 and 941. The rules 950 and 951 may each define an action (or actions) that may be taken by the processing unit 910 or processing unit 911 when certain conditions have been met. As shown, each of the processing units 910 and 911 is associated with its own rules. The rules 950 are associated with the processing unit 910 and the rules 951 are associated with the processing unit 911. The rules 950 and 911 may be the same rules, or may be different rules. Alternatively, both of the processing units 910 and 911 may share a common set of rules. Each of the rules 950 and 951 may be set by a user or administrator.

The packet data 940 and 941 may be a record of the packets received by the processing units 910 and 911 from one or more other multipath failsafes. An example of packet data 940 that may be recorded by the processing unit 910 for a packet 920 received from a particular multipath failsafe may be an identifier of the multipath failsafe that generated the packet 920. Where the packet 920 includes a heartbeat signal and a sequence number, the processing unit 910 may include the sequence number and a time when the packet 920 was received in the packet data 940. Other information may be recorded in the packet data 940, such as an e-stop status included in the packet 920.

Each processing unit may apply their respective rules to incoming packets and/or packet data. Example rules include rules based on heartbeat signals and rules based on e-stop statuses. With respect to heartbeat signals, the rules may include a maximum time duration between heartbeat signals. In some scenarios, a constant, non-interrupted, sequence of heartbeat signals may be essential to ensure safety, while in other scenarios it may be permissible if the heartbeat signals are not received for some period of time.

For example, in an environment such as a factory, some e-stop controller 285 users such as machine operators, may be considered critical, and it may be desirable that a multipath failsafe 903 associated with a particular machine receive a constant heartbeat signal from the e-stop controller 285 associated with the corresponding machine operator. In contrast, for e-stop controllers 285 associated with non-critical users such as a foreman who may periodically exit a factory floor, it may not be essential that the particular machine receive a constant heartbeat signal from the e-stop controller 285 of the foreman. The maximum time durations between heartbeat signals for each multipath failsafe 903 may be set by a user or administrator, for example.

In another example of rules, rather than just setting a maximum time duration between heartbeat signals for each multipath failsafe 903, the rules may define a minimum number of associated multipath failsafes 903. For example, a rule may specify that the multipath failsafe 903 receive heartbeat signals from at least three other multipath failsafes 903 with a frequency of less than 5 ms. Continuing the example above, such a rule would ensure that at least three e-stop controllers 285 be in communication with the multipath fails safe 903 associated with a particular machine, but not require that any particular e-stop controller 285 be within range. Other types of rules and rule combinations may be defined.

With respect to e-stop status signals, the rules may also define what actions are taken by the multipath failsafe 903 when a packet is received that indicates that an e-stop has been activated. In some implementation, the rules may specify that the multipath failsafe 903 disable an associated machinery. In addition, the rules may specify that an alarm be triggered, and that one or more wired or wireless links be severed. In some implementations, the rules may be dependent on the particular multipath failsafe 903 that the e-stop status signal is received from. Continuing the example described above, some e-stop status signals received from e-stop controllers 285 associated with non-critical factory workers may cause the multipath failsafe 903 to sound an alarm associated with the machine, while e-stop status signals received from e-stop controllers 285 associated with critical factory workers such as machine operators may cause the multipath failsafe 903 to halt the associated machinery. The particular actions may be set by a user or administrator.

Depending on the implementation, whether or not the processing units 910 and 911 agree on a particular heartbeat signal or e-stop status, may be considered when applying rules. For example, as noted above, the processing units 910 and 911 may provide redundancy and failover protection by each receiving heartbeat signals on different paths 930 and 931. Accordingly, in some implementations, before the processing unit 910 takes one or more actions according to a particular rule 950 because a heartbeat signal has not been received over the path 930 in a duration of time that exceeds a threshold, the processing unit 910 may first ask the processing unit 911, via the path 901, if it has received a corresponding heartbeat signal over the path 931. If so, the processing unit 910 may determine that the heartbeat signal must have been lost in transmission, and that no action may be taken. Else, the processing unit 910 and/or processing unit 911 may take whatever action is specified in the rules 950 and/or rules 951 (e.g., activate e-stop, sound alarm, disable radio, etc.).

In some scenarios, only when the processing units 910 and 911 agree that a rule has been triggered, is any action taken by the multipath failsafe 903. Thus, continuing the example above, only if both the processing unit 910 and the processing unit 911 agree that no heartbeat signal has been received over either the path 930 of the path 931, is any action taken. In other scenarios, if either the processing unit 910 or the processing unit 911 determines that a rule has been triggered, an action is taken. For example, if the processing unit 910 receives an indication that an e-stop has been triggered in a packet 920, the processing unit 910 may perform an associated action, regardless of whether or not a similar packet 921 has been received by the processing unit 911.

Figure 10:
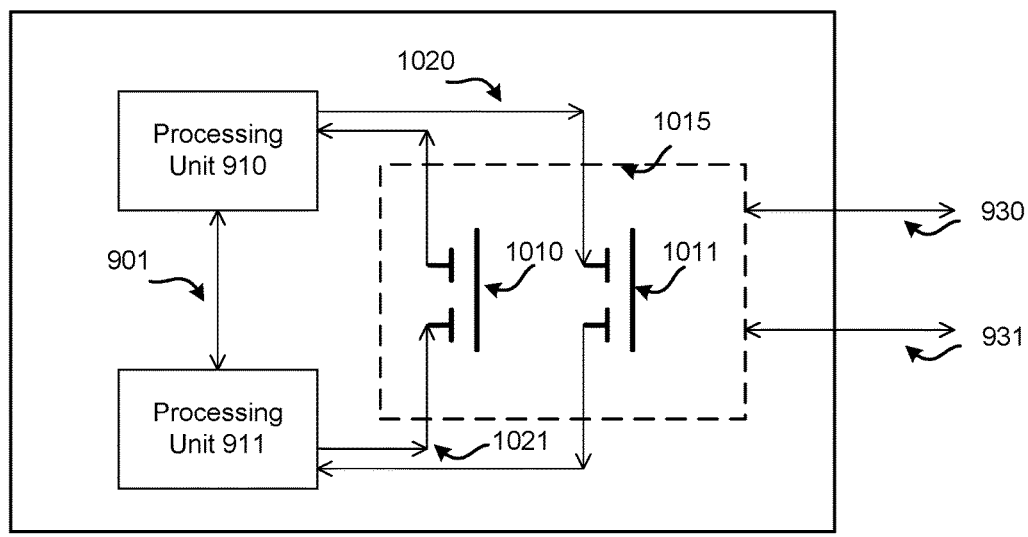
FIG. 10 is an illustration of an example multipath failsafe incorporating a safety relay 1015.

FIG. 10 is an illustration of an example multipath failsafe 903 incorporating a safety relay 1015. In some implementations, the safety relay 1015 may include two switches 1010 and 1011. The switches 1010 and 1011 may be mechanically linked switches in that they are configured such that when the switch 1010 is open, the switch 1011 is also open, and when the switch 1010 is closed, the switch 1011 is also closed, and vice versa. The switches 1011 and 1010 may be connected to one or more components of the multipath failsafe 903, such that opening or closing the switches 1010 and 1011 can activate or deactivate the associated components. For example, the switches 1011 and 1010 may be connected to an e-stop, such that activating either of the switches 1011 or 1010 will trigger the e-stop. In another example, the switches 1011 or 1010 may be connected to a wireless or wired interface and activating either of switches may cause any connection using the wireless or wired interface to be severed. Other types of connections may be supported While such mechanically linked switches are reliable, in order to detect the scenario where the switches 1011 and 1010 have become unlinked, the processing units 910 and 911 of the multipath failsafe 903 may periodically communicate to each other through the switches 1010 and 1011 to ensure that the switches 1011 and 1010 have the same state (i.e., both open or both closed). In the example shown in FIG. 10, the processing units 910 and 911 may communicate through two paths 1020 and 1021 through the safety relay 1015. The path 1021 may be a path from the processing unit 911 to the processing unit 910 though the switch 1010. The path 1020 may be a path from the processing unit 910 to the processing unit 911 through the switch 1011.

In some implementations, the processing unit 910 may send a signal to the processing unit 911 through the path 1020. The signal may be sequence of bits, for example. Other types of signals may be used. After sending the signal to the processing unit 911 through the path 1020, the processing unit 910 may interrogate the processing unit 911 regarding the signal over the path 901. If the processing unit 911 responds with the correct signal that was transmitted by the processing unit 910, then the processing unit 910 may determine that the switch 1011 is open. Otherwise the processing unit 910 may determine that the switch is closed.

The processing unit 910 may then determine if the state of the switch 1011 matches the known state of the safety relay 1015 (i.e., both switches open or both switches closed). If the state of the switch matches the state of the safety relay 1015, then the processing unit 910 may assume that the safety relay 1015 is working correctly. Else, the processing unit 910 may assume that the safety relay 1015 is malfunctioning, and may take one or more remedial actions (e.g., sounding an alarm, triggering an e-stop, disabling a wired or wireless interface, etc.). The processing unit 911 may similarly test the safety relay 1015 by sending a signal to the processing unit 910 through the switch 1010 of the path 1021, and interrogating the processing unit 910 regarding the signal over the path 901.

Depending on the implementation, the processing units 910 and 911 may test the safety relay 1015 through the paths 1020 and 1021 at fixed intervals. For example, one or both of the processing units 910 and 911 may test the safety relay every minute, five minutes, hour, etc. Any length interval may be selected by a user or administrator. Alternatively or additionally, the processing units 910 and 911 may test the safety relay 1015 after the occurrence of specific events. The events may include the initialization of one or both of the processing units 910 and 911, after a change of the status of the safety relay 1015, and the association of the multipath failsafe 903 with a new device such as a machine or vehicle. Other events may be supported and may be specified by a user or administrator.

Figure 11:
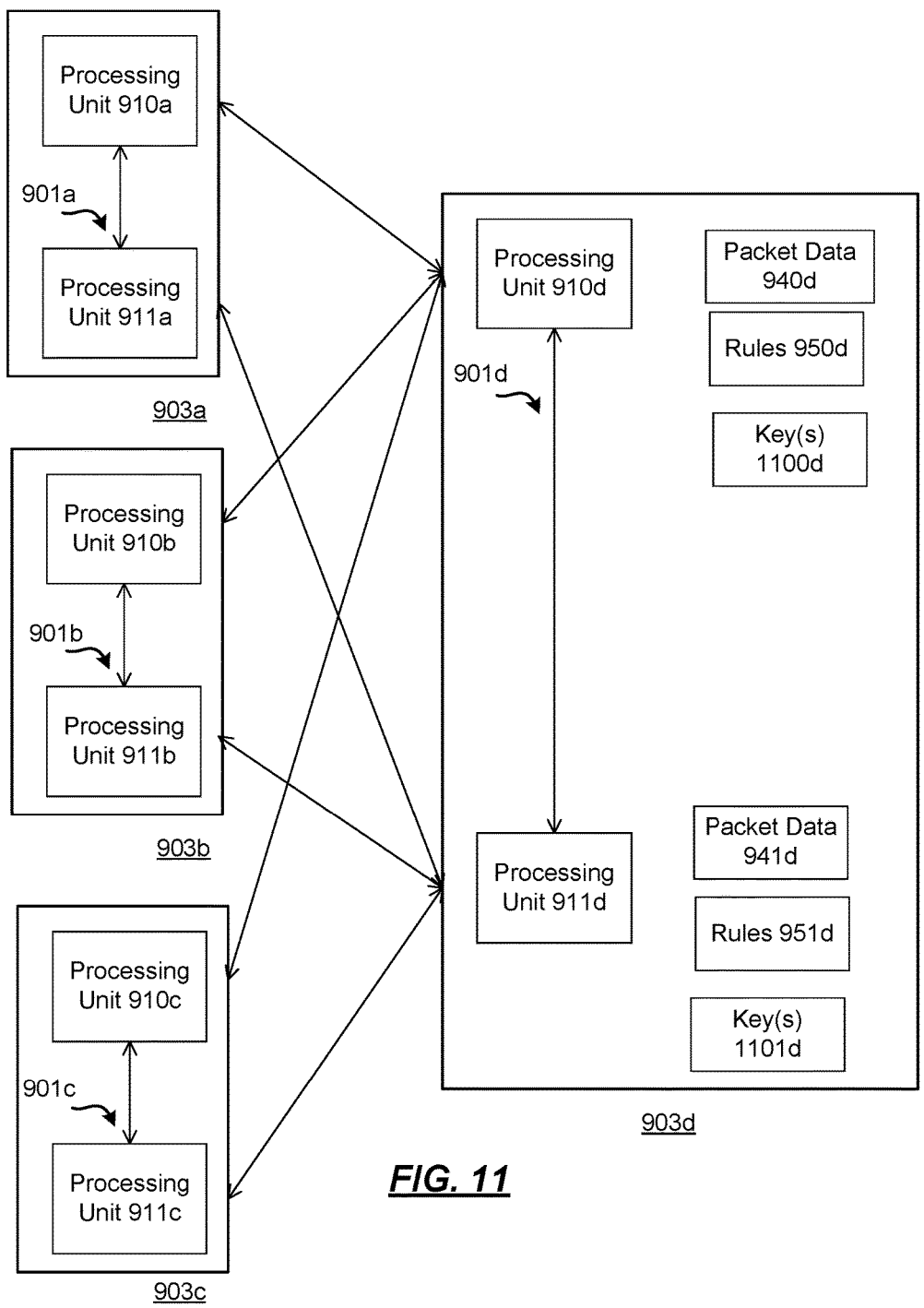
FIG. 11 is an illustration of multiple multipath failsafes communicating over multiple shared channels.

FIG. 11 is an illustration of multiple multipath failsafes 903 communicating over multiple shared channels. As illustrated, there are four multipath failsafes 903 in communication (i.e., the multipath failsafes 903a, 903b, 903c, and 903d), however more or fewer multipath failsafes 903 may be supported.

In the example shown, the multipath failsafe 903d may be integrated into, or part of a MCS 230, and may be associated with one or more machines or vehicles. The multipath failsafe 903d may interface with an e-stop 284 associated with the machine or vehicle, for example. The multipath failsafes 903a-c may be each associated with one or more peripheral devices that control the operation of the machine or vehicle corresponding to the multipath failsafe 930d. For example, the multipath failsafe 903a may be part of a controller such as the HHC 280, and the multipath failsafes 903c and 903d may each be part of a wireless (or wired) e-stop controller 285 that are paired with the machine or vehicle.

As described previously in FIG. 9, each multipath failsafe 903 may include a processing unit 910 and a processing unit 911 communicating over a path 901 to provide redundancy and failover protection to each of the multipath failsafes 903.

As shown in FIG. 11, the multipath failsafe 903a includes a processing unit 910a and a processing unit 911a communicating over a path 901a; the multipath failsafe 903b includes a processing unit 910b and a processing unit 911b communicating over a path 901b; the multipath failsafe 903c includes a processing unit 910c and a processing unit 911c communicating over a path 901c; and the multipath failsafe 903d includes a processing unit 910d and a processing unit 911d communicating over a path 901d. While not shown in FIG. 11, each of the multipath failsafes 901a-d may further include a safety relay 1015 as described in FIG. 10.

Each of the processing units 910 and 911 on the multipath failsafes 903a, b, and c may communicate with their corresponding processing units 910 and 911 on the multipath failsafe 903d. Thus, the processing units 910a, 910b, and 910c may each exchange packets 920 with the processing unit 910d, and the processing units 911a, 911b, and 911c may each exchange packets 921 with the processing unit 910d. To provide redundancy and failover protection, the various processing units 910 may communicate with each other using different frequencies or channels than are used by the processing units 911. For example, the processing units 910 may communicate using 1 GHz frequency, while the processing units 911 may communicate using a 2.4 GHz frequency. Other frequencies and/or channels may be used.

To provide security, some or all of the packets 920 and 921 communicated between the processing units 910 and 911 may be encrypted. Depending on the implementation, each of the processing units 910a-d and 911a-d may be associated with one or more keys. Each of the processing units 910a-c and 911a-c may encrypt some or all of the packets send to the corresponding processing unit 910d or 911d of the multipath failsafe 903d using their associated keys. Any method for encrypting packets may be used.

In order to decrypt the received packets, the processing units 910d and 911d of the multipath failsafe 903d may have access to one or more keys 1100d and 1101d. These keys may correspond to the keys used by the processing units 910a-c and 911a-c to encrypt their respective packets. Depending on the type of encryption used, the keys used to encrypt the packets may be the same as the keys used to decrypt the packets (i.e., symmetric key encryption). Alternatively, different keys may be used to encrypt and decrypt the packets (i.e., asymmetric key encryption). Any type of encryption known in the art may be used. While not shown, each of the multipath processing units 910a-c may also have access to the keys, or may only have access to key(s) that can decrypt packets received from the multipath failsafe 903d.

Depending on the implementation, when the processing unit 910d receives a packet 920 from a processing unit 910, such as the processing unit 910a, the processing unit 910d may retrieve a key corresponding to the processing unit 910a from the keys 1100d, and may use the retrieved key to decrypt the packet 920. Because the packet 920 is encrypted and can only be decrypted using one of keys 1100, an operator or administrator associated with the multipath failsafes 903 can be assured that in the event that the packet 920 is intercepted by a malicious user, the contents of the packet 920 cannot be read by the malicious user without the corresponding key.

In addition, because the packet cannot be encrypted without knowledge of the key corresponding to the processing unit 910 or the processing unit 911, the multipath failsafes 903 can also be assured that a packet 920 or 921 cannot be spoofed by a malicious user. For example, only the processing unit 910c may generate a packet that can be decrypted using the key corresponding to the processing unit 910c. Accordingly, when the processing unit 910d successfully decrypts a packet 920 received from the processing unit 910c, the processing unit 910d can assume that the packet 920 is authentic (i.e., not spoofed), and was not generated by one of the other processing units or other multipath failsafes 903.

Depending on the implementation, each of the processing units 910 and 911 may be associated with a different key. In such an implementation, each of the processing units 910a, 910b, 910c, 910d, 911a, 911b, 911c, and 911d may be associated with a different key. In another implementation, each of multipath failsafes 903 may be associated with a different key. In such an implementation, the processing units 910a and 911a of the multipath failsafe 903a may be associated with a first key; the processing units 910b and 911b of the multipath failsafe 903b may be associated with a second key; the processing units 910c and 911c of the multipath failsafe 903c may be associated with a third key; and the processing units 910d and 911d of the multipath failsafe 903d may be associated with a fourth key.

The processing units 910d and 911d of the multipath failsafe 903d may receive packets 920 and 921 respectively from the processing units 910 and 911 of the multipath failsafes 903a, 903b, and 903c, and each packet may include one or more of heartbeat signals and e-stop statuses, for example. Depending on the implementation, the processing unit 910d may store information related to the heartbeat signals and e-stop statuses of the processing units 910a, 910b, and 910c in the packet data 940d, and the processing unit 911d may store information related to the heartbeat signals and e-stop statuses of the processing units 911a, 911b, and 911c in the packet data 941d. Examples of information that may be included in the packet data include, for each processing unit and/or multipath failsafe 903, an indicator of a sequence number of the last heartbeat signal that was received, a time when the last heartbeat signal was received, and an indication of the most recently received e-stop status. Other information may be included.

The processing units 910d and 911d of the multipath failsafe 903d may take one more actions with respect to the packet data and/or received packets according to one or more of rules 950d and 951d. As described above with respect to FIG. 9, the rules may be triggered based on the type on information in the packets (i.e., heartbeat signal or e-stop status), the length of time since a previous heartbeat signal was received from a particular processing unit and/or multipath failsafe 903, and the type or importance of the worker and/or device associated with the particular processing unit and/or multipath failsafe 903. Other information may be considered.

For example, as described above, the multipath failsafe 903a may be part of the HHC 280. Because being in communication with the HHC 280, or any controller, may be considered essential for the operation of the machine or vehicle associated with the multipath failsafe 930d, the multipath failsafe 930d may include a rule that is triggered when a heartbeat signal has not been received from either the processing unit 910a and 911a of the multipath failsafe 903a within a relatively short window of time as recorded in the packet data.

In contrast, because multipath failsafes 903c and 903d may each be part of a e-stop controller 285, it may not be essential that each of the e-stop controllers 285 be in constant communication with the multipath failsafe 903. Accordingly, the multipath failsafe 930d may include a rule that is triggered when a heartbeat signal has not been received from either the multipath failsafes 903b and 903c within a relatively long window of time as recorded in the packet data. Other rules may be supported.

Figure 12:
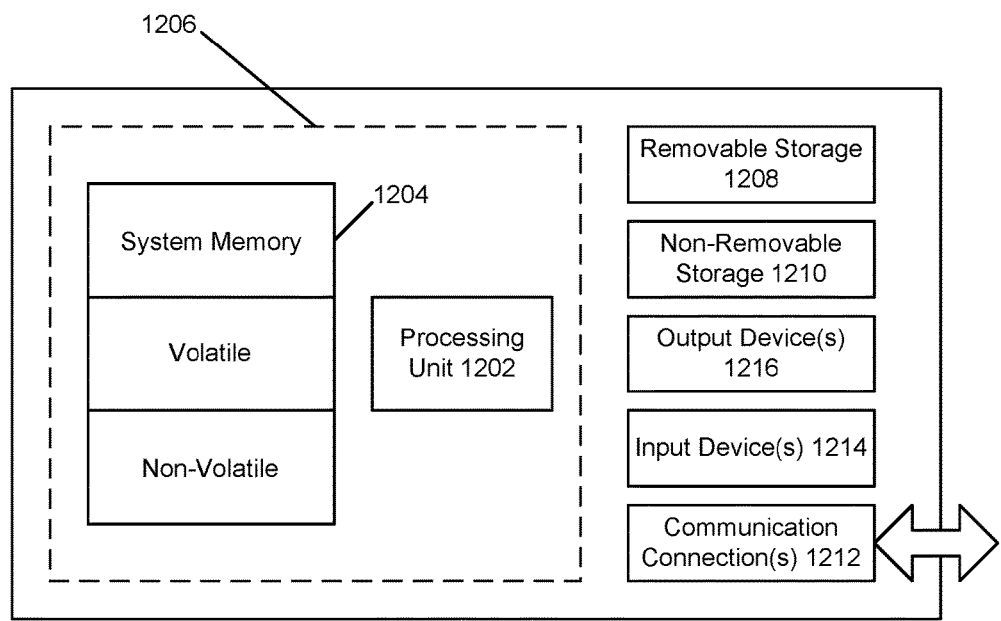
FIG. 12 is an illustration of an example computing environment where aspects of the invention may be implemented.

FIG. 12 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 12, an exemplary system for implementing aspects described herein includes a computing device, such as computing system 1200. In its most basic configuration, computing system 1200 typically includes at least one processing unit 1202 and memory 1204. Depending on the exact configuration and type of computing device, memory 1204 may be volatile (such as random access memory (RAM)), non-volatile (such as read-only memory (ROM), flash memory, etc.), or some combination of the two. This most basic configuration is illustrated in FIG. 12 by dashed line 1206.

Computing system 1200 may have additional features/functionality. For example, computing system 1200 may include additional storage (removable and/or non-removable) including, but not limited to, magnetic or optical disks or tape. Such additional storage is illustrated in FIG. 12 by removable storage 1308 and non-removable storage 1210.

Computing system 1200 typically includes a variety of computer readable media. Computer readable media can be any available media that can be accessed by computing system 1400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1204, removable storage 1208, and non-removable storage 1210 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 900. Any such computer storage media may be part of computing system 1200.

Computing system 1200 may contain communications connection(s) 1212 that allow the device to communicate with other devices and/or interfaces. Computing system 1200 may also have input device(s) 1214 such as a keyboard (software or hardware), mouse, pen, voice input interface, touch interface, etc. Output device(s) 1216 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A first device comprising:
a first processing unit, wherein the first processing unit is adapted to determine a first status of a first connection between the first processing unit of the first device and a corresponding first processing unit of a second device; and
a second processing unit, wherein the second processing unit is adapted to determine a second status of a second connection between the second processing unit of the first device and a corresponding second processing unit of the second device, wherein the first processing unit is further adapted to:
receive the second status of the second connection from the second processing unit of the first device over a path between the first processing unit of the first device and the second processing unit of the first device; and
determine one or more actions to take with respect to a machine associated with the first device based on one or both of the first status and the second status.

2. The first device of claim 1, wherein the first device is one or more of an e-stop controller or a hand held controller.

3. The first device of claim 1, wherein the machine is a vehicle and the first device is an e-strop controller associated with the vehicle.

4. The first device of claim 1, wherein the first processing unit and the second processing units are microcontrollers.

5. The first device of claim 1, wherein determining the first status of the first connection comprises determining that the first connection has been severed.

6. The first device of claim 5, wherein determining that the first connection has been severed comprises determining that a heartbeat signal has not been received by the first processing unit of the first device from the first processing unit of the second device for more than a threshold duration of time.

7. The first device of claim 1, wherein the first status indicates whether the first connection has been severed and the second status indicates whether the second connection has been severed, and the first processing unit adapted to determine one or more actions to take with respect to the machine associated with the first device based on one or both of the first status and the second status comprises the first processing unit adapted to halt the machinery when both the first connection and the second connection have been severed.

8. The first device of claim 1, wherein the first status indicates whether the first connection has been severed and the second status indicates whether the second connection has been severed, and the first processing unit adapted to determine one or more actions to take with respect to the machine associated with the first device based on one or both of the first status and the second status comprises the first processing unit adapted to halt the machinery when either the first connection and the second connection have been severed.

9. The first device of claim 1, wherein the first connection and the second connection are wireless.

10. The first device of claim 9, wherein the first connection and the second connection use different wireless frequencies or different wireless channels.

11. The first device of claim 1, wherein the first device further comprises a safety relay and, and wherein the safety relay includes a first switch and a second switch.

12. The first device of claim 11, wherein when the safety relay is in a closed state the first switch and the second switch are both closed, and when the safety relay is in an open state the first switch and the second switch are both open.

13. The first device of claim 12, wherein the first processing unit is further adapted to:
send a first signal through the first switch of the safety relay to the second processing unit;
interrogate the second processing unit about the signal over the path between the first processing unit and the second processing unit; and
based on the interrogation, determine if the second processing unit received the first signal through the first switch.

14. The first device of claim 13, wherein the first processing unit is further adapted to:
when the safety relay is in the open state and it is determined that the second processing unit received the first signal, determine that the safety relay has malfunctioned.

15. The first device of claim 13, wherein the first processing unit is further adapted to:

when the safety relay is in the closed state and it is determined that the second processing unit received the first signal, determine that the safety relay has not malfunctioned.

16. The first device of claim 12, wherein the second processing unit is further adapted to:
   send a second signal through the second switch of the safety relay to the first processing unit;
   interrogate the first processing unit about the signal over the path between the first processing unit and the second processing unit; and
   based on the interrogation, determine if the first processing unit received the second signal through the second switch.

17. The first device of claim 15, wherein the second processing unit is further adapted to:
   when the safety relay is in the open state and it is determined that the first processing unit received the first signal, determine that the safety relay has malfunctioned.

18. The first device of claim 13, wherein the first processing unit is further adapted to:
   when the safety relay is in the open state and it is determined that the second processing unit received the first signal, determine that the safety relay has not malfunctioned.

19. The first device of claim 12, wherein the first switch and the second switch are mechanically linked.

* * * * *